United States Patent Office 3,444,177
Patented May 13, 1969

3,444,177
N-PHENYL-5-(DIMETHYLSULFAMOYL)-
ANTHRANILIC ACID, ESTERS AND
AMIDES THEREOF
Paul Schmidt and Kurt Eichenberger, Therwil, Basel-Land, and Alberto Rossi, Oberwil, Basel-Land, and Max Wilhelm, Allschwil, Switzerland, assignors to Ciba Corporation, New York, N.Y., a corporation of Delaware
No Drawing. Continuation-in-part of applications Ser. No. 261,498, Feb. 27, 1963, and Ser. No. 571,428, Aug. 10, 1966. This application Jan. 30, 1967, Ser. No. 612,366
Claims priority, application Switzerland, Mar. 9, 1962, 2,852/62
Int. Cl. C07c 143/80; C07d 87/00; A61k 27/00
U.S. Cl. 260—239.7                        11 Claims

ABSTRACT OF THE DISCLOSURE

New compounds of the formula

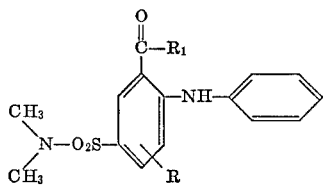

R=hydrogen, alkyl, alkoxy, halogen;
R₁=amino, mono-alkylamino, dialkylamino, alkyleneamino, oxaalkyleneamino, thiaalkyleneamino, azaalkyleneamino, alkoxy, hydroxy.

For example: 5-(dimethylsulfamoyl)-2-anilino-benzoic acid; use: anti-inflammatory agents.

Cross-references to related application

This is a continuation-in-part of our application Ser. No. 571,428 filed Aug. 10, 1966, now abandoned, which is in turn a continuation-in-part of our application Ser. No. 261,498, filed Feb. 27, 1963 (now abandoned).

Background of the invention

The invention concerns new N-phenyl-5-(dimethylsulfamoyl)-anthranilic acids, esters and amides thereof, their salts and their preparation. In the United Kingdom patent specification No. 466,505

5-(dimethylsulfamoyl)-2-(p-methoxyanilino)-benzoic acid,
5-(diethylsulfamoyl)-2-(p-methoxyanilino)-benzoic acid,
5-dimethylsulfamoyl)-2-(p-toluidino)-benzoic acid,
5-(dimethylsulfamoyl)-2-(m-toluidino)-benzoic acid and
N-(β-diethylaminoethyl)-5-(diethylsulfamoyl)-2-(p-methoxyanilino)-benzoic acid amide are described as intermediates, but the pharmacological activity of the said compounds has not yet been described. It has been found that the new N-phenyl-5-(dimethylsulfamoyl)-anthranilic acids, esters and amides as described below have valuable pharmacological properties.

Summary of the invention

The present invention concerns anthranilic acid derivatives of the formula

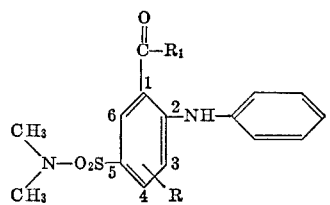

in which R₁ stands for lower alkoxy, amino, mono-lower alkylamino, di-lower alkylamino, lower alkyleneamino, lower mono-oxa-alkyleneamino, lower monoaza-alkyleneamino or lower monothiaalkyleneamino, or preferably for hydroxyl, and R for lower alkyl, lower alkoxy, halogen, or preferably hydrogen, and their salts.

In the above mentioned groups lower alkyl radicals are for example methyl, ethyl, n-propyl or isopropyl groups or straight or branched butyl, pentyl, hexy or heptyl groups which may be linked in any desired position. Lower alkoxy groups are particularly methoxy, ethoxy, propoxy or butoxy groups.

Halogen atoms are especially fluorine or bromine atoms, above all chlorine atoms.

Lower alkylene radicals are e.g., butylene-1:4, pentylene-1:5, hexylene-1:5, hexylene-1:6 or heptylene-2:6 radicals. Lower monooxaalkylene radicals are above all 3-oxapentylene-1:5, 3-oxa-hexylene-1:5, 3-oxa-hexylene-1:6 or 4-oxa-heptylene-2:6 radicals. Lower monothiaalkylene radicals are above all 3-thiapentylene-1:5, 3-thia-hexylene-1:5, 3-thia-hexylene-1:6 or 4-thio-heptylene-2:6 radicals. Lower monoazaalkylene radicals are above all 3-azapentylene-1:5, 3-lower alkyl-3-aza-pentylene-1:5, 3-azahexylene-1:5, 3-lower alkyl-3-aza-hexylene-1:5, 3-azahexylene-1:6, 3-lower alkyl-3-aza-hexylene-1:6, 4-azaheptylene-2:6 or 4-lower alkyl-4-aza-heptylene-2:6 radicals. Thus, a lower alkylene-amino, monooxaalkyleneamino, monothiaalkyleneamino or monoazaalkyleneamino radical is, for example, an optionally C-lower alkylated pyrrolidino, piperidino, hexamethyleneimino, morpholino, thiomorpholino, piperazino or N-lower alkyl-piperazino radical.

The new compounds possess anti-inflammatory, antipyretic and anti-allergic properties which enable them to be used pharmacologically or as medicaments, for example in the treatment of inflammatory and allergic process or for alleviating pain. They are also valuable intermediates for the manufacture of other compounds, more especially such as are suitable for use as pharaceuticals.

Special mention deserve the compounds of the formula

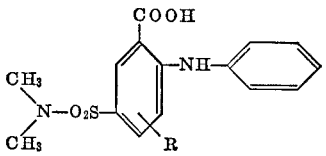

in which R represents a hydrogen or chlorine atom, and their salts and particularly 5-(dimethylsulfamoyl)-4-chloro-2-anilinobenzoic acid and 5-(dimethylsulfamoyl)-2-anilino-benzoic acid and their salts.

The new compounds are obtained by known methods. Thus, for example, a compound of the formula

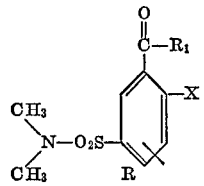

in which $R_1$ and R have the above meanings and X stands for a halogen atom, especially chlorine or bromine, is reacted with aniline; or a compound of the formula

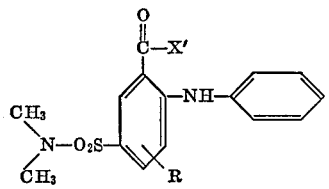

in which R has the meanings given above and X' is a halogen atom, especially a chlorine atom, is treated with a compound of the formula $R_1H$, in which $R_1$ has the above meaning, e.g., with water, ammonia, an alcohol of the formula $R_1H$ or a salt thereof, or with an amine of the formula $R_1H$.

The above-mentioned reactions are performed in the usual manner, in the presence or absence of solvents, diluents, acidic or basic condensing agents and/or catalysts, at room temperature or below or above it, if desired under superatmospheric pressure and/or under an inert gas.

In the resulting compound substituents can be introduced, converted or eliminated in the usual manner. Thus for example, a resulting free acid can be converted into an ester in the usual manner, for example by reaction with an alcohol of the formula $R_1H$ in the presence of an esterification catalyst, such as an acid, or into the amides, for example by reaction with ammonia or an amine of the formula $R_1H$ followed by dehydration of the ammonium salt.

Another route leading to the amides is, for example, the reaction of a resulting 2-anilino-5-(dimethylsulfamoyl)-benzoic acid with formaldehyde, giving rise to the corresponding 2-H-3:1-benzoxazinone-(4) which is then reacted with ammonia or with an amine of the formula $R_1H$.

A resulting ester or amide can be hydrolyzed in the known manner to yield the free acid. A resulting ester, more especially a lower alkyl ester, can be converted into an amide by reaction with ammonia or with an amine of the formula $R_1H$.

The aforementioned reactions are carried out in the conventional manner, in the presence or absence of diluents, condensing agents and/or catalysts, at room temperature or below or above it, if desired under superatmospheric pressure and/or under an inert gas.

Depending on the reaction conditions and starting materials used, and depending on whether the final product contains acidic or basic groups, the new compounds are obtained in the free form or in the form of their salts. A resulting salt can be converted into the free compound in known manner, an acid addition salt for instance by reaction with a basic agent, or a metal salt by reaction with an acid. When the resulting product is a free base, it can be converted into a salt thereof with an inorganic or organic acid. Acid addition salts are preferably prepared with therapeutically acceptable acids, such as hydrohalic acids, for example hydrochloric or hydrobromic acid, perchloric, nitric or thiocyanic acid, a sulfurica or phosphoric acid, or with organic acids as formic, acetic, propionic, glycollic lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicyclic, 4-aminosalicyclic, 2-phenoxy-benzoic, 2-acetoxybenzoic, methanesulfonic, ethanesulfonic, hydroxyethanesulfonic, benzenesulfonic, a halogeno-benzenesulfonic, para-toluenesulfonic, naphthalenesulfonic acid or a sulfamylic acid; or methionine, tryptophan, lysine or arginine. If an acid compound is obtained, it can be converted into a corresponding salt by a known method, for example by reaction with a basic agent, particularly with a therapeutically acceptable base, for example with a metal hydroxide or a basic salt, more especially an alkali or alkaline earth metal hydroxide such as sodium, potassium or calcium hydroxide, an alkali metal carbonate such as sodium or potassium carbonate, with ammonia or an organic amine.

The salts of the new compounds are also suitable for purifying the resulting free compounds by converting the free compound into a salt thereof which is then isolated and the free compound is liberated from it again.

The starting materials are known or, insofar as they are new, they can be made by known methods. Some of them may be prepared for instance by the process described above with suitable modification of the procedure or selection of the starting materials.

The invention includes also any variant of the process in which an intermediate obtainable at any stage of the process is used as starting material and any remaining step or steps is/are carried out; or the process is discontinued at any stage thereof; or in which the starting material is formed under the reaction conditions.

The new compounds may be used as medicaments, for example in the form of pharmaceutical preparations containing said compounds or salts thereof in admixture or conjunction with an organic or inorganic, solid or liquid pharmaceutical excipient suitable for enteral, parenteral or local administration. Suitable excipients are substances that do not react with the new compounds such, for example, as water, gelatine, lactose, starch, magnesium stearate, talcum, vegetable oils, benzyl alcohols, gums, polyalkylene glycols, white petroleum jelly, cholesterol or other known medicinal excipients. The pharmaceutical preparations may be, for example, tablets, dragees, ointments or creams, or in liquid form solutions, suspensions or emulsions. They may be sterilized and/or may contain assistants such as preserving, stabilizing, wetting or emulsifying agents, salts for regulating the osmotic pressure, or buffers. They may also contain further therapeutically useful substances. The preparations are formulated by the usual methods.

The new compounds may also be used in the form of additives to animal feedstuffs, with the use, for example, of the conventional extenders and diluents or feedstuffs respectively.

The following examples illustrate the invention without restricting its scope.

Example 1

A mixture of 52.6 grams of 5-(dimethylsulfamoyl)-2-chlorobenzoic acid, 148 grams of aniline, 30 grams of anhydrous potassium carbonate and 1 gram of cupric oxide is heated for 2 hours in an oil bath at 180–200° C. The excess aniline is then expelled with hot steam. The residue is boiled with 20 grams of Norit for 15 minutes, the Norit is then filtered off, the clear filtrate is slowly mixed with a solution of 30 cc. of concentrated hydrochloric acid in 150 cc. of water, and the grey precipitate is filtered off. Recrystallization from alcohol yields 5-(dimethylsulfamoyl)-2-anilino-benzoic acid of the formula

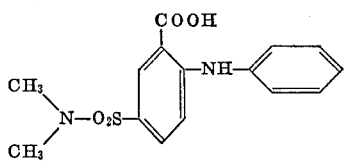

in white crystals melting at 200–201° C.

Example 2

32 grams of 5-(dimethylsulfamoyl)-2-anilino-benzoic acid are introduced into a solution of 20 grams of sulfuric acid of 100% strength in 100 cc. of methanol. The mixture is heated for 15 hours at the boil, the reaction solution is then allowed to cool and made up with water and ice, while stirred, to a volume of 1 liter, and the precipitate is filtered off. Recrystallization from a small amount of alcohol yields 5-(dimethylsulfamoyl)-2-anilino-benzoic acid methyl ester of the formula

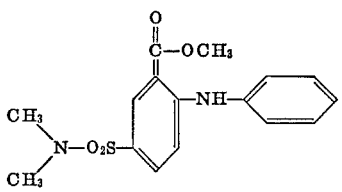

in white crystals melting at 118–119° C.

Example 3

10 grams of monoethylamine are mixed at 0° C. with 8 grams of 1-phenyl-6-(dimethylsulfamoyl)-2-H-3:1-benzoxazinone-(4), and the mixture is kept for 12 hours at 15° C. On evaporation of the excess amine a crystalline residue is obtained which is recrystallized from alcohol, to yield N-ethyl-2-anilino-5-(dimethylsulfamoyl)-benzamide of the formula

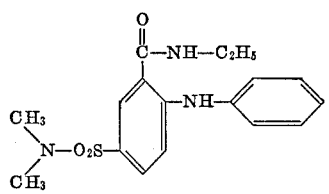

in crystals melting at 160–161° C.

1 - phenyl-6-(dimethylsulfamoyl)-2-H-3:1-benzoaxzinone-(4) used as starting material can be prepared as follows:

10 grams of 5-(dimethylsulfamoyl)-2-anilino-benzoic acid (see Example 1) are dissolved in 30 cc. of boiling ethanol, and 30 cc. of Formalin are added to the hot solution. On cooling, a crystalline precipitate forms which is filtered off and recrystallized from alcohol, to yield 1 - phenyl-6-(dimethylsulfamoyl)-2-H-3:1-benzoxazinone-(4) of the formula

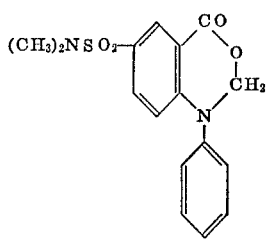

in crystals melting at 148–150° C.

Example 4

A mixture of 20 grams of 5-(dimethylsulfamoyl)-2-chloro-3-methylbenzoic acid, 55 grams of aniline, 12 grams of anhydrous potassium carbonate and 0.5 gram of cupric oxide is heated for 2½ hours with stirring in an oil bath of 180–200° C. The excess aniline is then expelled by steam distillation, the filtrate is clarified by being boiled with Norit, the clear filtrate is slowly acidified with 2 N-hydrochloric acid, and the precipitate is filtered off and recrystallized from aqueous ethanol, to yield 5-(dimethylsulfamoyl)-3-methyl-2-anilino - benzoic acid of the formula

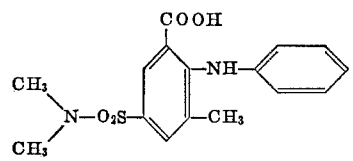

in the form of faintly violet crystals melting at 220–223° C.

Example 5

A mixture of 20 grams of 5-(dimethylsulfamoyl)-2:4-dichlorobenzoic acid, 52 grams of aniline, 11.6 grams of anhydrous potassium carbonate and 0.5 gram of cupric oxide is heated for 2½ hours in an oil bath at 190–200° C. After cooling, 100 cc. of N sodium hydroxide solution and 200 cc. of ether are stirred in. The aqueous layer is separated in a separating funnel, clarified with Norit and slowly acidified with 2 N hydrochloric acid. The solid precipitate is dried, recrystallized from ethyl acetate+petroleum ether and from aqueous methanol, to yield 5-(dimethylsulfamoyl)-4-chloro-2-anilinobenzoic acid of the formula

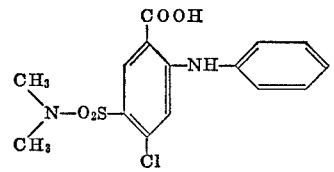

in the form of brown crystals melting at 210 to 214° C.

5-(dimethylsulfamoyl)-2:4-dichlorobenzoic acid used as starting material is prepared as follows:

140 grams of 2:4-dichlorobenzoic acid-5-sulfonyl chloride are slowly stirred into a solution of 120 grams of dimethylamino in 1 liter of water at room temperature. After stirring for 2 hours, the reaction solution is clarified with Norit, acidified with concentrated hydrochloric acid while cooling with ice, and the solid precipitate is filtered off and recrystallized from ethanol, to yield 5-(dimethylsulfamoyl)-2:4-dichlorobenzoic acid in the form of faintly brown crystals melting at 180–183° C.

Example 6

A mixture of 47 grams of 5-(dimethylsulfamoyl)-2-chlorobenzoic acid amide, 130 grams of aniline, 27 grams of anhydrous potassium carbonate and 1 gram of cupric oxide is heated for 2 hours in an oil bath at 180–200° C. Working up according to Example 1 yields 5-(dimethylsulfamoyl)-2-anilinobenzoic acid amide of the formula

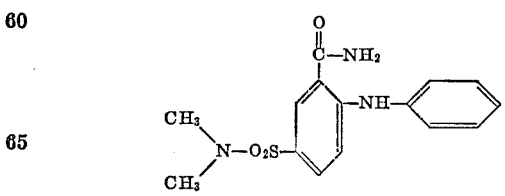

in white crystals melting at 215–217° C.

Example 7

A solution of 5.8 grams of 5-(dimethylsulfamoyl)-2-anilino-benzoic acid chloride and 3.5 grams of n-hexylamine in 150 cc. of benzene is heated at the boil for 3 hours with stirring. The reaction is then allowed to cool, the precipitated hexylamine hydrochloride is filtered with suction, the benzene evaporated in vacuo and the residue put into 100 cc. of water. The portion which is insoluble in water is recrystallized with heating from 450 cc. of isopropyl ether to yield 5-(dimethylsulfamoyl)-2-anilino-benzoic acid n-hexylamide of the formula

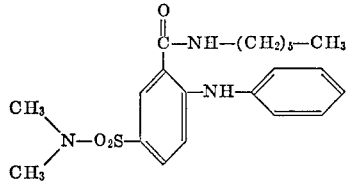

in the form of yellow crystals melting at 126–127° C.

The 5-(dimethylsulfamoyl)-2-anilino-benzoic acid chloride used as starting material may be prepared as follows:

5 grams of 5-(dimethylsulfamoyl)-2-anilino-benzoic acid in 100 cc. of thionyl chloride are heated in a bath at 70° C. for 1½ hours with stirring. The thionyl chloride is evaporated in vacuo and the residue recrystallized from boiling benzene. 5-(dimethylsulfamoyl)-2-anilino-benzoic acid chloride of the formula

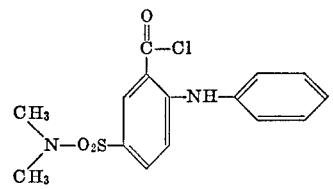

is obtained in the form of yellowish crystals melting at 154–155° C.

Example 8

A solution of 8 grams of 5-(dimethylsulfamoyl)-2-anilino-benzoic acid chloride and 4.8 grams of N-methyl-piperazine in 150 cc. of benzene is heated at the boil for 3 hours with stirring. The reaction mixture is allowed to cool, the precipitated methylpiperazine hydrochloride is filtered off, and water is added to the residue. The solid product which does not dissolve in water is filtered with suction and recrystallized from alcohol to yield 5-(dimethylsulfamoyl) - 2 - anilino - benzoic acid-(N'-methyl-piperazide) of the formula

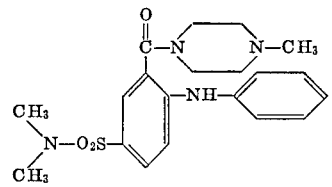

in the form of yellowish crystals melting at 154–155° C.

Example 9

Tablets containing 200 mg. of 5-(dimethylsulfamoyl)-2-anilino-benzoic acid may be prepared, for example, with the following ingredients:

| | Mg. |
|---|---|
| 5-(dimethylsulfamoyl)-2-anilino-benzoic acid | 200.0 |
| Lactose | 38.0 |
| Wheat starch | 22.0 |
| Gelatine | 6.0 |
| Arrowroot | 18.0 |
| Magnesium stearate | 1.5 |
| Talc | 14.5 |
| | 300.0 |

Method

The 5-(dimethylsulfamoyl)-2-anilino-benzoic acid is homogeneously mixed with the lactose and wheat starch and passed through a sieve having an 0.5 mm. mesh. The gelatine is dissolved in ten times its weight of water and the powder mixture is evenly moistened with the solution and kneaded until a plastic mass is formed. The latter is passed through a sieve having a 3 mm. mesh, dried at 45° C. and then passed through a sieve of 1.5 mm. mesh. Arrowroot, magnesium stearate and talc, in a finely sieved form, are added to the resulting granulate and the whole is compressed in the conventional manner to tablets weighing 300 mg. and having a diameter of 9 mm.

We claim:

1. A member selected from the group consisting of compounds of the formula

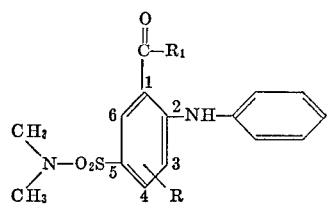

in which $R_1$ stands for a member selected from the group consisting of hydroxy, lower alkoxy, amino, mono-lower alkylamino, di-lower alkylamino, pyrrolidino, piperidino, hexamethyleneimino, morpholino, thiomorpholino, piperazino, N-lower alkyl-piperazino, 1 - aza - 4 - oxa-cycloheptyl - 1, 1 - aza - 4 - thia - cycloheptyl - 1, 1,4-diaza - cycloheptyl - 1, and 4 - lower alkyl - 1,4 - diaza-cycloheptyl - 1 and R for a member selected from the group consisting of hydrogen, lower alkyl, lower alkoxy and halogen, R being other than hydrogen when $R_1$ is hydroxy; and their acid addition, alkali group and alkaline earth metal salts.

2. A compound as claimed in claim 1, wherein $R_1$ stands for hydroxy and R for a member selected from the group consisting of lower alkyl, and halogen.

3. A compound as claimed in claim 1, wherein $R_1$ stands for hydroxy and R for chlorine.

4. A compound as claimed in claim 1, which is an acid addition, alkali group, or alkaline earth metal salt of the said compound wherein $R_1$ stands for hydroxy and R for hydrogen.

5. A compound as claimed in claim 1, wherein $R_1$ stands for methoxy and R for hydrogen.

6. A compound as claimed in claim 1, wherein $R_1$ stands for ethylamino and R for hydrogen.

7. A compound as claimed in claim 1, wherein $R_1$ stands for hydroxy and R for 3-methyl; or an acid addition, alkali group, or alkaline earth metal salt thereof.

8. A compound as claimed in claim 1, wherein $R_1$ stands for hydroxy and R for 4-chloro; or an acid addition, alkali group, or alkaline earth metal salt thereof.

9. A compound as claimed in claim 1, wherein $R_1$ stands for amino and R for hydrogen.

10. A compound as claimed in claim 1, wherein $R_1$ stands for n-hexylamino and R stands for hydrogen.

11. A compound as claimed in claim 1, wherein $R_1$ stands for N'-methyl-piperazino and R for hydrogen; or an acid addition, alkali group, and alkaline earth metal salt thereof.

References Cited

FOREIGN PATENTS 466,505  5/1937  Great Britain.

HENRY R. JILES, Primary Examiner.

C. M. SHURKO, Assistant Examiner.

U.S. Cl. X.R.

260—239.6, 239.8, 244, 397.7, 470, 518, 556; 424—228, 229